(12) United States Patent
Dyer

(10) Patent No.: US 6,402,489 B1
(45) Date of Patent: Jun. 11, 2002

(54) AIRCRAFT TIRE MOLD VENT PINS

(75) Inventor: Dale Kenneth Dyer, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/874,781

(22) Filed: Jun. 5, 2001

(51) Int. Cl.[7] ............................................. B29C 35/02
(52) U.S. Cl. ........................... 425/28.1; 425/36; 425/37
(58) Field of Search ................... 425/28.1, 35, 36, 425/37, 46

(56) References Cited

U.S. PATENT DOCUMENTS

| 1,718,631 A | * | 6/1929 | Brundage | 425/37 |
|---|---|---|---|---|
| 1,733,064 A | * | 10/1929 | Lambert | 425/37 |
| 1,778,071 A | * | 10/1930 | Fleiter | 425/37 |
| 2,031,560 A | | 2/1936 | Day | |
| 2,047,858 A | | 7/1936 | Day | 152/13 |
| 3,096,541 A | * | 7/1963 | Sindelar | 425/37 |
| 4,257,154 A | | 3/1981 | Fuller | 29/432 |

FOREIGN PATENT DOCUMENTS

AU            235440    *  9/1961 ..................... 425/37

* cited by examiner

Primary Examiner—James P. Mackey
(74) Attorney, Agent, or Firm—Frederick K. Lacher; Bruce J Hendricks

(57) ABSTRACT

A tire mold has vent pins extending axially into the mold cavity for penetration of the lower sidewall bead area of the tire providing vents in the tire upon opening of the mold.

8 Claims, 3 Drawing Sheets

AIRCRAFT TIRE MOLD VENT PINS

BACKGROUND OF THE INVENTION

1. Field of Invention

This invention relates to venting a tire during the molding process by penetration of the tire lower sidewall bead area by axially extending pins during closing of the mold and removal of the pins during opening of the mold without damaging the tire.

2. Description of the Related Art

Tire venting is necessary with certain tires such as those used for aircraft where the inflation pressures are very high. If the air does not have a path to escape it can become trapped inside the layers of the tires and cause separation of the components. One way of providing this venting is by stabbing the tires with an awl to provide vent holes for diffusion of the air out of the tires. This stabbing has been done manually and may cause inaccuracy in placement and depth of the vent holes.

In U.S. Pat. Nos. 2,031,560 and 2,047,858 hollow needles have been inserted through lateral passages in the tire mold to vent the tire during molding. The needles were hollow and inserted after the mold was closed on the tire. The needles were then removed before the mold was opened. This method is time consuming and is dependent on the hollow needles being maintained with open channels for releasing the air.

Another attempt to provide venting of a tire is described in U.S. Pat. No. 4,257,154 where elongated flexible air guides are inserted in the bead area of a tire after it is vulcanized. This involves using a threaded tool for use with an electric drill to install the air guides.

SUMMARY OF THE INVENTION

The present invention is directed to a method of providing vents in the bead area of a tire by penetration of the tire with axially extending pins mounted at spaced apart positions on the axially moveable mold components. This is accomplished with a conventional tire mold having axially moveable bead forming surfaces on which the pins are supported. The pins may be mounted on the sidewall mold plate or on the mold ring depending on the construction of the mold.

In accordance with one aspect of the invention there is provided a tire mold for vulcanizing a tire, having bead portions, the mold having mold halves with each of the mold halves having axially moveable mold components characterized by a plurality of vent forming pins mounted on at least one of the components at circumferentially spaced venting positions in a bead forming area and each of the pins extending in a generally axial direction into a tire forming cavity of the mold whereby the pins will penetrate the bead portions of the tire in the mold and form vents in the bead portions of the tire upon movement of the mold halves and the mold components together in an axial direction.

In accordance with another aspect of the invention, there is provided a method of molding axially extending vent holes in the bead areas of a tire in a tire mold having an upper mold half and a lower mold half, characterized by:

(a) providing axially extending pins on the upper mold half and on the lower mold half at spaced apart positions in a bead forming area of each mold half;

(b) placing a tire in the mold;

(c) closing the mold by moving the upper mold half and the lower mold half together in an axial direction causing the pins to penetrate the tire and form vents;

(d) applying heat under pressure to the tire in the mold;

(e) opening the tire mold by moving the mold halves apart in an axial direction; and, removing the tire from the mold in an axial direction to withdraw the pins from the bead areas of the tire.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, preferred embodiments of which will be described in detail in this specification and illustrated in the accompanying drawings which form a part hereof and herein.

DESCRIPTION OF THE PREFERRED EMBODIMENT

Figure 1:
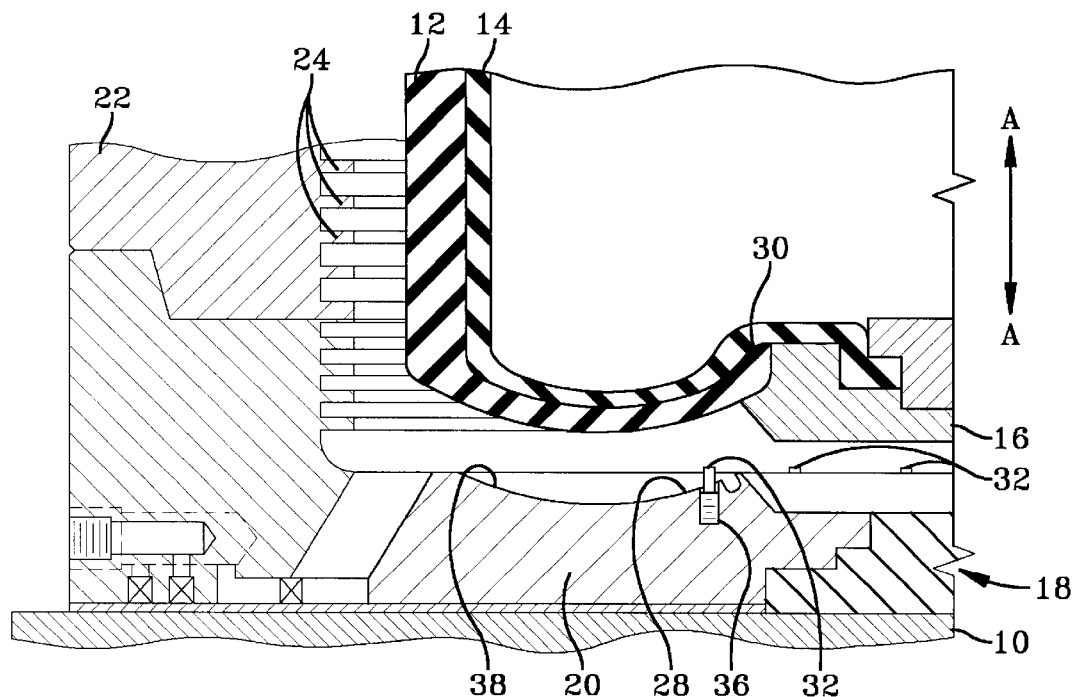
FIG. 1 is sectional view with parts broken away showing a tire in a mold embodying the invention with the pins of the invention mounted in the sidewall mold plate in the open position of the mold prior to closing and vulcanization.
Figure 2:
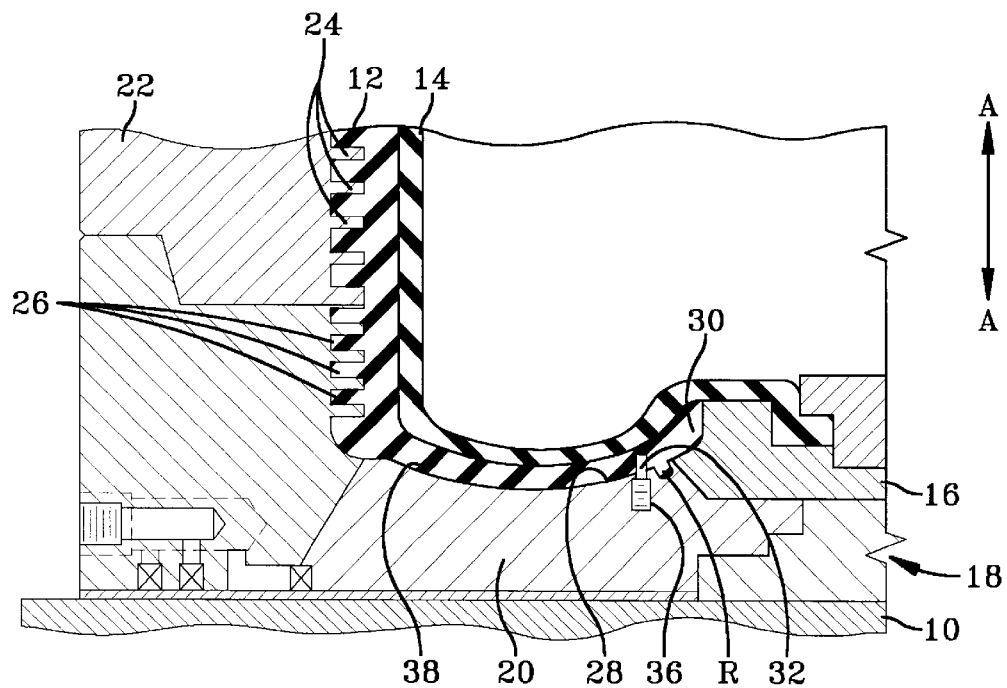
FIG. 2 is a view like FIG. 1 showing the mold closed with the pins penetrating the bead area of the tire.

Referring to FIGS. 1 and 2 a fragmentary view of a tire press 10 embodying the invention is shown with an uncured tire 12 supported on a tire shaping bladder 14 clamped in a mold ring 16 of a tire mold 18. The tire mold 18 has a lower mold half 20 mounted on the tire press 10 and an upper mold half (not shown) mounted on an upper tire press member for moving axially in a direction A—A toward and away from the lower mold half 20. Radially moveable tread mold segments 22 are mounted on the press 20 for radial movement towards the tire 12 in the position shown in FIG. 2 upon closing of the tire mold 18. During this movement the tread forming ribs 24 engage the tire 12 and form the tire tread 26 as shown in FIG. 2.

Figure 5:
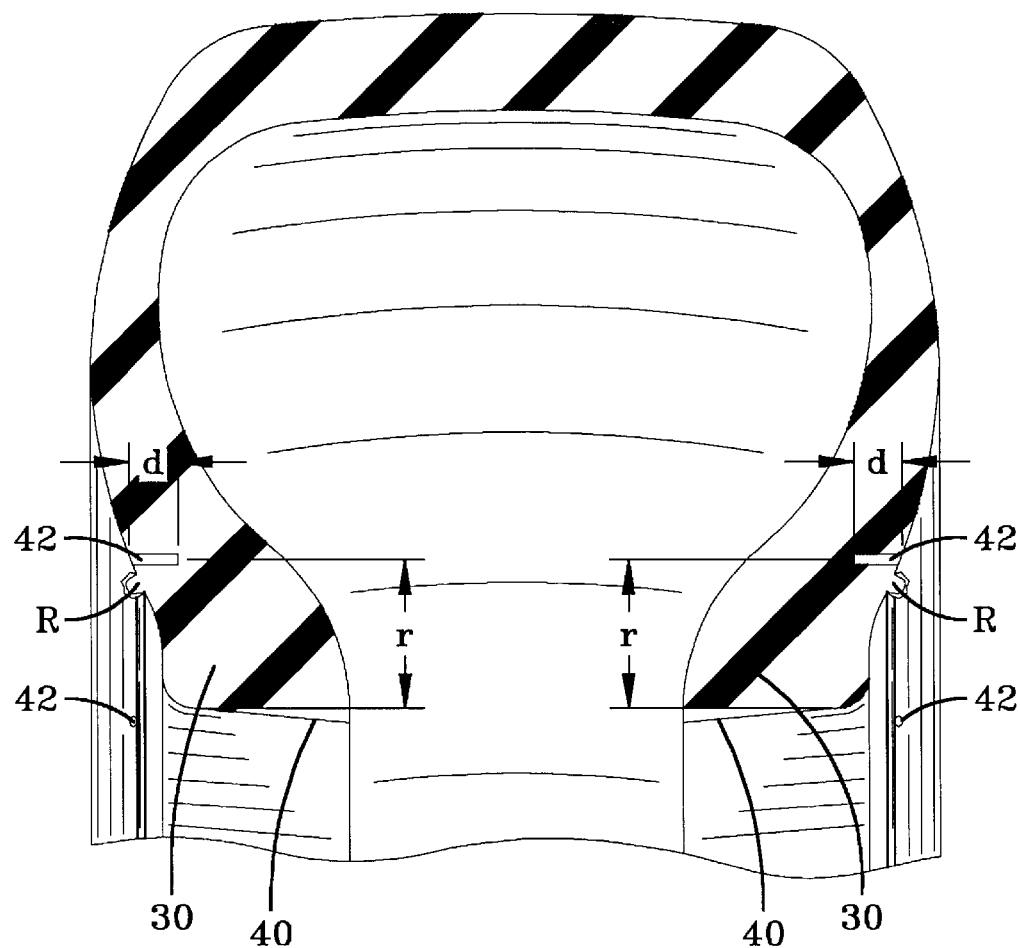
FIG. 5 is a schematic cross-section of a tire showing the position of the vents provided by the vent pins of the invention.
Figure 6:
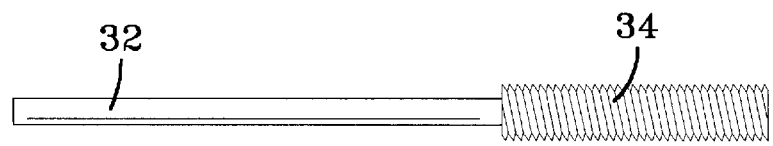
FIG. 6 is a detailed enlarged view of one of the vent pins embodying the invention.

As shown in FIG. 1 the lower mold half 20 has a bead forming area 28 for shaping a tire bead 30. In accordance with the invention vent forming pins 32 are mounted in the lower mold half 20 at circumferentially spaced positions. As shown in FIG. 6 each of the pins 32 has a threaded end 34 for turning in a threaded hole 36 in the sidewall mold plate. By turning the pin 32 a selected number of revolutions the length of the pin extending into a tire-forming cavity 38 can be selected to determine the distance D the pin 36 penetrates the tire bead 30. This distance D is selected in accordance with the tire being molded and the bead configuration as shown in FIG. 5 where the penetration is a distance D and the pin 36 is located a predetermined radial distance R from the rim engaging surface 40 of the tire 12. The pins 32 are located at circumferentially spaced positions around the lower mold half 20 and may be spaced apart at an angular distance of between 16 and 45 degrees depending on the tire size and ply rating. In this embodiment the pins, are spaced apart at an angular distance of 20 degrees.

In operation the tire 12 after being built on a tire building machine is placed in the tire press 10 over a bladder 14 and moved into a seated position on the mold ring 16 upon inflation of the bladder. The mold ring 16 is then moved axially in a direction A—A causing the tire bead 30 to move axially into engagement with the bead forming area 28 and penetration of the bead 30 by the pins 32. As shown in FIG. 2, the radially moveable tread segments 22 are then moved radially inward into engagement with the tread portion of the tire 12 to form the tire tread 26. While the illustrations in FIGS. 1 and 2 show a lower mold ring 16 and lower mold half 20, the upper mold half and upper mold ring have the same construction with pins 32 penetrating the upper tire bead in the same manner as described above. The tire 12 is cured under heat and pressure in a manner well known in the art after which the radially moveable tread segments 22 are moved radially outward after forming the tread. The mold ring 16 is then moved axially pulling the pins 32 out of the bead 30 and providing vent holes 42 in the tire bead 30 as shown in FIG. 5. Because the opening movement of the lower mold half 20 and the upper mold half are in axial direction A—A there is no tearing of the tire at the tire beads 30.

Figure 3:
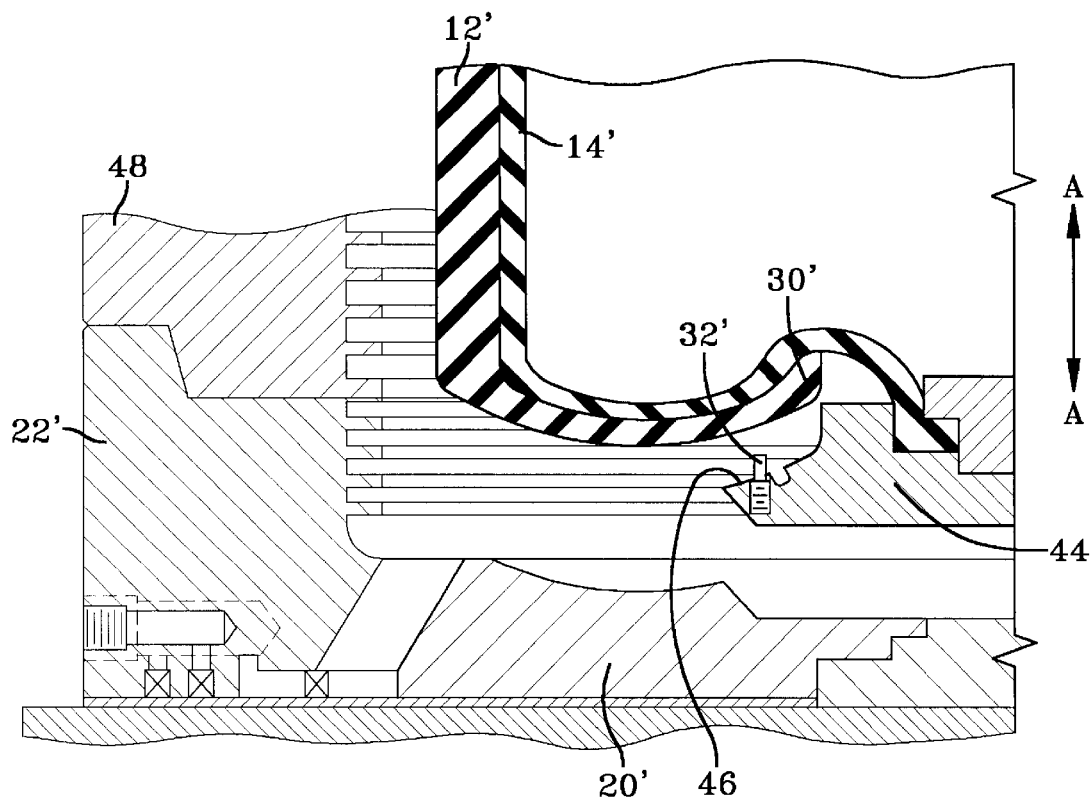
FIG. 3 is a view like FIG. 1 showing a mold in which the vent pins are mounted in the mold ring of the mold.
Figure 4:
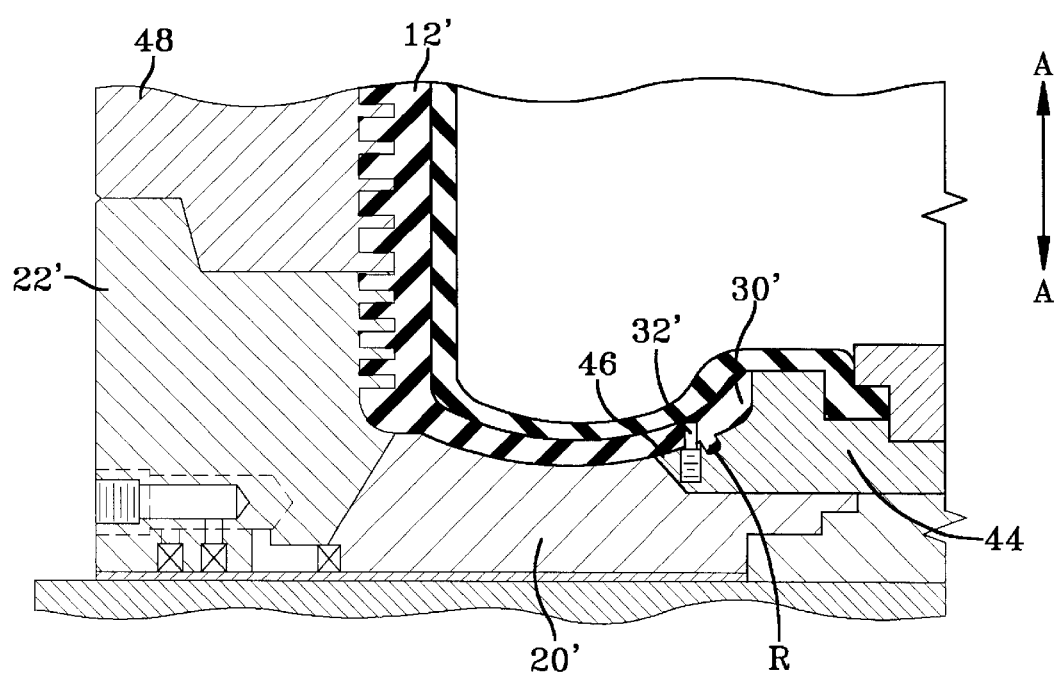
FIG. 4 is a view like FIG. 3 showing the mold closed with the pins penetrating the bead area of the tire.

The construction shown in FIGS. 1 and 2 is for a mold having a low mold ring split. However, this invention may also be practiced with a mold having a high mold ring split as shown in FIG. 3 and 4. In this embodiment, the pins 32 are mounted in a mold ring 44 which has a bead forming area 46. The other parts of this tire mold 48 are substantially the same of the tire mold 18 of FIGS. 1 and 2 and are designated by the same numerals with a prime mark.

In operation, the bladder 14' in the tire 12' is positioned between the lower mold half 20' and an upper mold half not shown. The bladder 14' is inflated and the tire 12' shaped between the upper mold half and lower mold half 20' which are moved axially in a direction A—A whereupon the tire bead 30' is moved axially into engagement with the pins 32' penetrating the beads as shown in FIG. 4. The radially moveable tread segments 22' are moved into engagement with the tread area of tire 12' and form the tire tread. After the tire 12' is cured the radially moveable tread segments 22' are moved to the position shown in FIG. 3 and the upper mold half and lower mold half 20' are separated causing the pins 32' to be withdrawn from the tire bead 30' and form the vent holes 42 as shown in FIG. 5.

The preferred position of the pins 32 and 32' is in the bead forming area 28 and 28' of either mold ring 44, 16' or the bead forming area 28, 46 at a position plus or minus 0.01 inch (0.0254 cm) from the a rim alignment rib R of the tire mold 18 or 48. The rib R groove is located at a position close to and above the position on the tire which will be adjacent the edge of the tire rim so that the vent holes 42 are open to the atmosphere in operation of the tire on a wheel rim. The position of the outer edge of the rim alignment rib R, is shown in FIGS. 2, 4, and 5.

While certain representative embodiments and detailed have been shown for the purpose of illustrating the invention, it will apparent to those skilled in the art that various changes and modifications may be made therein without departing from the scope of the invention.

What is claimed is:

1. tire mold for vulcanizing a tire, having bead portions, said mold having mold halves with each of said mold halves having axially moveable mold components characterized by a plurality of vent forming pins mounted on at least one of said components at circumferentially spaced venting positions in a bead forming area and each of said pins extending in a generally axial direction into a tire forming cavity of said mold whereby said pins will penetrate said bead portions of said tire in said mold and form vents in said bead portions of said tire for releasing air from said tire upon movement of said mold halves and said mold components together in an axial direction.

2. The tire mold of claim 1 further characterized by said one of said mold components comprising an axially moveable sidewall mold plate having said bead forming area for mounting said pins.

3. The tire mold of claim 1 further characterized by said one of said mold components comprising an axially moveable mold ring having said bead forming area for mounting said pins.

4. The tire mold of claim 1 further characterized by the length of said pins extending into said bead forming cavity being adjustably mounted for predetermining the amount of penetration of said bead portions of said tire.

5. The tire mold of claim 4 further characterized by said pins having a threaded connection to said one of said mold components for predetermining the penetration of said tire by rotating said mold pins in said of one of said components a predetermined number of revolutions.

6. The tire mold of claim 5 further characterized by said threaded connection comprising threads on said mold pins and threaded holes in said one of said components.

7. The tire mold of claim 1 having axially moveable mold halves and a plurality of radially moveable tread mold segments with each of said mold components being mounted on one of said mold halves.

8. The tire mold of claim 1 further characterized by said vent forming pins being spaced apart at circumferentially spaced venting positions at an angular distance of between 16 and 45 degrees.

* * * * *